(12) United States Patent
Yoon et al.

(10) Patent No.: US 6,841,068 B1
(45) Date of Patent: Jan. 11, 2005

(54) DOMESTIC NANOFILTRATION MEMBRANE BASED WATER PURIFIER WITHOUT STORAGE TANK

(75) Inventors: Sung Ro Yoon, Kyunggi-do (KR); Soon Sik Kim, Seoul (KR); Hoon Hyung, Kyunggi-do (KR); Young Hoon Kim, Kyunggi-do (KR)

(73) Assignee: Saehan Industries Incorporation, Kyungsangbuk-do (KR)

( * ) Notice: Subject to any disclaimer, the term of this patent is extended or adjusted under 35 U.S.C. 154(b) by 193 days.

(21) Appl. No.: 10/341,336

(22) Filed: Jan. 13, 2003

(51) Int. Cl.[7] .............................. C02F 1/44; C02F 9/00; B01D 61/04; B01D 61/08

(52) U.S. Cl. ............... 210/266; 210/321.6; 210/321.73; 210/321.8; 210/500.28; 210/500.33; 210/652

(58) Field of Search ................ 210/266, 321.6, 210/321.73, 321.8, 500.28, 500.33, 652

(56) References Cited

U.S. PATENT DOCUMENTS

| | | | | |
|---|---|---|---|---|
| 5,266,207 A | * | 11/1993 | Boye et al. | 210/653 |
| 5,308,492 A | * | 5/1994 | Loew et al. | 210/631 |
| 5,445,729 A | * | 8/1995 | Monroe et al. | 210/86 |
| 5,520,816 A | * | 5/1996 | Kuepper | 210/649 |
| 5,616,249 A | * | 4/1997 | Hodgdon | 210/651 |
| 5,858,240 A | * | 1/1999 | Twardowski et al. | 210/652 |
| 2003/0196955 A1 | * | 10/2003 | Hughes | 210/650 |

FOREIGN PATENT DOCUMENTS

| | | | |
|---|---|---|---|
| FR | 2738233 A1 | * | 3/1997 |
| WO | 97/14659 | * | 4/1997 |

* cited by examiner

*Primary Examiner*—Thomas M. Lithgow
(74) *Attorney, Agent, or Firm*—Harrison & Egbert

(57) ABSTRACT

A domestic nanofiltration membrane based water purifier without a storage tank. The water purifier according to the present invention uses a nanofiltration membrane filter as a main filtering section and does not have a storage tank for containment of purified water. Although conventional reverse osmosis membrane based water purification systems provide good quality water, they have problems in that installation of the storage tanks due to insufficient flow rate results in the increased volumes of water purifiers, and at the same time, secondary pollution may be caused by microorganism propagation upon prolonged storage. In this regard, the present invention provides a domestic nanofiltration membrane based water purifier without a storage tank, in which a nanofiltration membrane filter with a pore size of approximately 0.1 to 10 nm is used as a main filtering section.

5 Claims, 1 Drawing Sheet

DOMESTIC NANOFILTRATION MEMBRANE BASED WATER PURIFIER WITHOUT STORAGE TANK

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates to a domestic nanofiltration membrane based water purifier without a storage tank, and more particularly to a domestic nanofiltration membrane based water purifier, which does not use a storage tank for containment of purified water, contrary to conventional water purification systems in which purified water is stored in their storage tanks for use when a demand occurs.

BACKGROUND OF THE INVENTION

In step with industrial progress, water pollution and water resources scarcity are emerging as severe problems. Because of industrial advancement, population growth, and increased standards of living, the demand to good quality water is increasing rapidly. However, water pollution due to domestic waste or industrial sewage has become a serious problem and therefore, available water has become scarce. In order to utilize limited water resources efficiently, purification treatment is absolutely necessary before drinking natural water is to be consumed, in addition to the removal of sources of water pollution.

Conventional water purifiers take forms of different kinds of purification systems depending on filter type. At present, the purification system using a filtration membrane is considered to be the most effective because it can eliminate impurities including minute substances such as bacteria and heavy metals.

As representative filtration membranes for use in water purifiers, there exist an ultrafiltration membrane, a nanofiltration membrane and a reverse osmosis membrane. Among them, the ultrafiltration membrane is used to remove mainly colloid-sized substances. Although it can provide a high flow rate due to larger pore size than those of the nanofiltration and reverse osmosis membranes, there is a limit to elimination of minute substances such as bacteria and heavy metals.

Meanwhile, the reverse osmosis membrane can eliminate almost all minute substances such as bacteria and heavy metals and thus has been widely used recently. Such reverse osmosis membrane based water purification systems are disclosed in several documents including U.S. Pat. Nos. 4,626,346 and 6,190,558. However, most such reverse osmosis membrane based water purifiers are provided with storage tanks for containment of purified water, due to insufficient flow rate. Therefore, there are problems in that the volumes of the purifiers are increased due to installation of the storage tanks, and microorganisms are propagated due to prolonged storage, thereby causing secondary pollution.

BRIEF SUMMARY OF THE INVENTION

Therefore, the present invention has been made in view of the above problems, and it is an object of the present invention to provide a domestic nanofiltration membrane based water purifier, which can eliminate almost all impurities including bacteria and heavy metals, and which does not require the installation of a storage tank for containment of purified water.

In accordance with the present invention, the above and other objects can be accomplished by the provision of a domestic nanofiltration membrane based water purifier without a storage tank, comprising of a pretreatment filtering section including a pretreatment filter and a pretreatment carbon filter, a main filtering section, and a post-treatment filtering section, characterized in that a nanofiltration membrane filter providing an adequate flow rate is used for the main filtering section.

Preferably, the nanofiltration membrane used in the present invention has a pore size ranging from about 0.1 to 10 nm, corresponding to a mean pore size between the reverse osmosis membrane and the ultrafiltration membrane. Advantageously, such nanofiltration membrane based water purifiers can selectively pass some monovalent ions that do not affect the human body and eliminate almost all multivalent ions, low molecular weight organic substances, and bacteria. In detail, as the nanofiltration membrane has a larger pore size than the reverse osmosis membrane, a desirable quantity of purified water can be immediately obtained from a purified water discharge valve by way of modulation of a pump pressure or an effective membrane area. Furthermore, the nanofiltration membrane can provide a sieving effect depending on a pore size such as in the ultrafiltration membrane and eliminate approximately 30 to 60% of monovalent ions and calcium ions by adsorption of the ions to the membrane surface. In particular, 90% or more of multivalent ions and salts such as sulfate can be eliminated, thereby providing drinking water containing a suitable amount of minerals.

The nanofiltration membrane is classified into a spiral wound type membrane and a hollow fiber type membrane depending on its preparation method, both of which can be used herein. It can be also classified into a polyamide based membrane and a polyvinylalcohol based membrane depending on membrane material. It can be used herein regardless of the membrane material providing that the pore size of the membrane ranges from 0.1 to 10 nm. Generally, the polyamide based membrane can be prepared by interfacial polymerization of a multivalent amine such as piperazine and methaphenylendiamine with trimesoylchloride on a microporous support. The polyvinylalcohol based membrane can be prepared by applying polyvinylalcohol to a microporous support, followed by curing.

Preferably, a nanofiltration membrane module of about 8 to 50 ft$^2$ effective membrane area, 1.5 to 4.5 inches outer diameter, and 8 to 18 inches length is used in order to provide an intake water volume ranging from about 1.0 to 3.5 liters/min. The intake water volume of less than 1.0 liters/min is insufficient for a water purifier without a storage tank. On the other hand, if the intake water volume exceeds 3.5 liters/min, the capacity of a pump must be increased and the size of the module is thus excessively increased.

BRIEF DESCRIPTION OF THE SEVERAL VIEWS OF THE DRAWINGS

The above object and other objects, features and advantages of the present invention will be more clearly understood from the following detailed description taken in conjunction with the accompanying drawing.

DETAILED DESCRIPTION OF THE INVENTION

Figure 1:
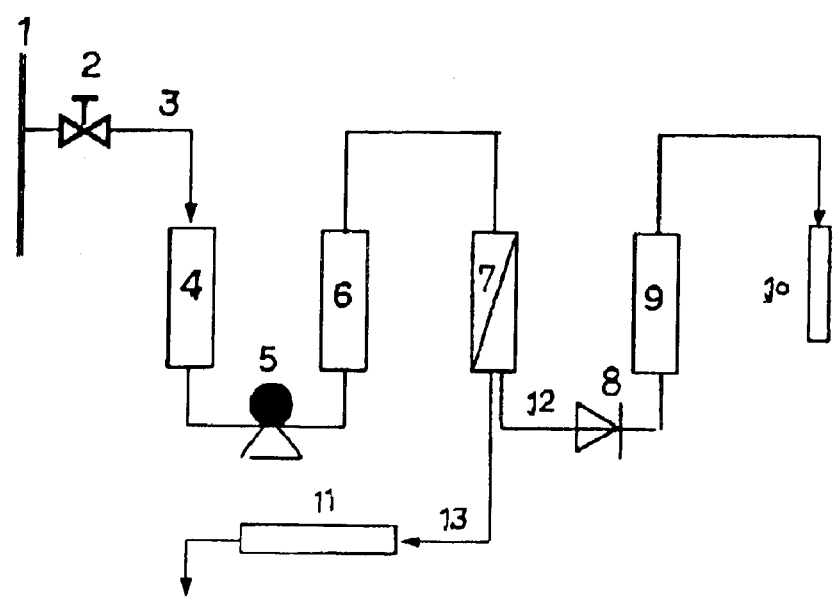
FIG. 1 is a schematic illustration of the water purification system of the water purifier according to the present invention.

Hereinafter, the present invention will be described in detail with reference to the accompanying figure.

As shown in FIG. 1, the water purification system according to the present invention is comprised of a water supply pipe 3, a pretreatment filter 4, a pretreatment carbon filter 6, a nanofiltration membrane filter 7 functioning as a main filtering section, a backflow prevention valve 8, a post-treatment filter 9 and a purified water discharge valve 10. During water purification, concentrate water from the nanofiltration membrane filter 7 is drained via a concentrate water pipe 13 by a flow control valve 11.

The pretreatment filter 4 may be a micro sediment filter of metal or plastic material, and a carbon filter such as a granulated active filter, a powdered active carbon filter and a rod active carbon filter, alone or in combination. The post-treatment filter 9 may be an ultraviolet sterilizing filter, an active carbon filter, a ceramic filter, a silver-containing active carbon filter, an ultrafiltration membrane filter and a magnetization filter, alone or in combination.

The nanofiltration membrane filter 7, which is the main filtering section in the water purification system according to the present invention, uses a nanofiltration membrane ranging from about 0.1 to 10 nm in pore size. The pore size of less than 0.1 nm is inadequate for a water purifier without the use of a storage tank, due to insufficient flow rate. On the other hand, if the pore size exceeds 10 nm, impurities such as heavy metals and bacteria cannot be completely eliminated. The purified water in the main filtering section is pumped to the post-treatment filter 9 via the backflow prevention valve 8 for final water purification. The finally purified water is directly drained from the purified water discharge valve 10, when needed.

A water pressure or a pressure pump 5 according to the present invention is designed to selectively modulate the input rate of raw water within a range of about 0.5 to 12 liter/min under an operating pressure condition within a range of about 15 to 120 psi.

Hereinafter, the present invention will be illustrated detail by way of the non-limiting examples.

EXAMPLE 1

The water purification system shown in FIG. 1 was operated under 30 psi operating pressure of the pressure pump 5 using a nanofiltration membrane module of 1.5 nm pore size, 23 ft$^2$ effective membrane area, 3.5 inches outer diameter, and 12 inches length. The flow rate and desalination rate were measured and their results are presented in Table 1 below.

NaCl and MgSO4 were present in raw water at concentrations of 500 ppm and 2,000 ppm respectively.

EXAMPLES 2–6

The same procedures were performed as in the example 1, except for using operating pressures as shown in Table 1. The water purification efficiency was evaluated and is presented in Table 1 below.

TABLE 1

| Example | Operating pressure (psi) | Flow rate (gpd) | Flow rate (ml/min) | NaCl elimination rate (%) | MgSO$_4$ elimination rate (%) |
|---|---|---|---|---|---|
| Example 1 | 30 | 390 | 1027 | 62.0 | 98.1 |
| Example 2 | 15 | 214 | 564 | 58.9 | 97.6 |
| Example 3 | 45 | 570 | 1498 | 63.8 | 98.3 |
| Example 4 | 60 | 729 | 1916 | 64.4 | 98.5 |
| Example 5 | 90 | 1014 | 2666 | 64.6 | 98.7 |
| Example 6 | 120 | 1335 | 3510 | 64.6 | 98.7 |

As apparent from the above examples, the purifiers using the water purification system according to the present invention can eliminate monovalent ions by a reasonable level and almost all divalent or multivalent salts. As a result, the inherent taste of water is maintained and impurities such as heavy metals and bacteria are eliminated, thereby providing good quality drinking water. Furthermore, drinking water can be directly obtained from the water purifier of the present invention without storage within an intake water volume of about 1.0 to 3.5 liter/min, when needed.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

We claim:

1. A domestic nanofiltration membrane based water purifier without a storage lank, said purifier comprising: a pretreatment filter, a pretreatment carbon filter, a main filtering section, a backflow prevention valve and a post treatment filter; wherein purified water is directly drained from a purified water discharge valve without storage; and wherein a nanofiltration membrane filter of pore size of 0.1 to 10 nm is used as the main filtering section in order to provide an intake water volume ranging from 1.0 to 3.5 liters/min.

2. The domestic nanofiltration membrane based water purifier without a storage tank as set fort in claim 1, wherein a nanofiltration membrane filter module of 8 to 50 ft$^2$ effective membrane area, 1.5 to 4.5 inches outer diameter, and 8 to 18 inches length is used as the nanofiltration membrane filter.

3. The domestic nanofiltration membrane based water purifier without a storage tank as set forth in claim 1, wherein the nanofiltration membrane filter is prepared by interfacial polymerization of piperazine or methaphenylendiamine with trimesoylchloride on a microporous support.

4. The domestic nanofiltration membrane based water purifier without a storage tank as set forth in claim 1, wherein the nanofiltration membrane filter is comprised of a spiral wound type nanofiltration membrane filter or a hollow fiber type nanofiltration membrane filter.

5. The domestic nanofiltration membrane based water purifier without a storage tank as set forth in claim 1, further comprising a pressure pump is coupled between the pretreatment filter and the pretreatment carbon filter.

* * * * *